(12) United States Patent
Li et al.

(10) Patent No.: US 11,486,858 B2
(45) Date of Patent: Nov. 1, 2022

(54) 3D DEFECT DETECTION METHOD WITH MAGNETIC FLUX LEAKAGE TESTING

(71) Applicant: Yichang Huateng Pipeline Engineering Co., Ltd., Yichang (CN)

(72) Inventors: Hongmei Li, Yichang (CN); Ranran Huang, Yichang (CN); Jia Yan, Yichang (CN)

(*) Notice: Subject to any disclaimer, the term of this patent is extended or adjusted under 35 U.S.C. 154(b) by 49 days.

(21) Appl. No.: 16/810,999

(22) Filed: Mar. 6, 2020

(65) Prior Publication Data

US 2020/0284760 A1 Sep. 10, 2020

(30) Foreign Application Priority Data

Mar. 7, 2019 (CN) .......................... 201910173344.5

(51) Int. Cl.
| | |
|---|---|
| G01N 27/83 | (2006.01) |
| G01B 7/00 | (2006.01) |
| G01N 27/72 | (2006.01) |
| G01N 27/82 | (2006.01) |

(52) U.S. Cl.
CPC .............. *G01N 27/83* (2013.01); *G01B 7/00* (2013.01); *G01N 27/72* (2013.01); *G01N 27/82* (2013.01)

(58) Field of Classification Search
CPC ........ G01N 27/83; G01N 27/72; G01N 27/82; G01B 7/00
See application file for complete search history.

(56) References Cited

U.S. PATENT DOCUMENTS

| 10,935,520 B2 * | 3/2021 | Huang | .................... | G01N 27/83 |
| 2016/0178580 A1 * | 6/2016 | Huang | .................... | G01N 27/83 |
| | | | | 702/190 |

FOREIGN PATENT DOCUMENTS

KR 20000040396 A * 7/2000

OTHER PUBLICATIONS

Singh, Waikhom & Thirunavukkarasu, Sannasi & Mahadevan, Sumitra & Bhagi, Purna Chandra & Mukhopadhyay, C.K. & Jayakumar, T.. (2010). Three-Dimensional Finite Element Modeling of Magnetic Flux Leakage Technique for Detection of Defects in Carbon Steel Plates. Proceedings of COMSOL Confere (Year: 2010).*
Huang Zuoying, Que Peiwen, Chen Liang,3D FEM analysis in magnetic flux leakage method,NDT & E International, vol. 39, Issue 1,2005,pp. 61-66,ISSN 0963-8695 (Year: 2005).*

(Continued)

*Primary Examiner* — Eman A Alkafawi
*Assistant Examiner* — Aeysha N Sultana

(57) ABSTRACT

The present invention discloses a 3D defect detection method with magnetic flux leakage testing (MFLT). It has advantages of higher accuracy of 3D detection of defect and simpler testing device relative to the prior MFLT art. This method includes the following steps: S1: artificially magnetizing a to-be-tested structure, and measuring its MFLT signals {B}; S2: inverting magnetic charge distribution of the interior of the to-be-tested structure by using a magnetic charge distribution reconstruction algorithm to obtain the magnetic charge density of a non-defective region of the to-be-tested structure; and S3: using the magnetic charge density of the non-defective region of the to-be-tested structure as a known constant, and conducting inverse iteration to reconstruct defect depth of the defective region to obtain a 3D image of the defective region of the to-be-tested structure.

2 Claims, 6 Drawing Sheets

(56) References Cited

OTHER PUBLICATIONS

Yan, et al. ("Theory and application of magnetic flux leakage pipeline detection." Sensors 15.12 (2015): 31036-31055 (Year: 2015).*

Suresh, V., and A. Abudhahir. "An analytical model for prediction of magnetic flux leakage from surface defects in ferromagnetic tubes." Measurement Science Review 16.1 (2016): 8.) (Year: 2016).*

* cited by examiner

Artificially magnetize a to-be-tested structure, and acquire its MFLT signals

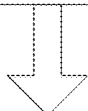

Reconstruct magnetic charge distribution of the interior of the to-be-tested structure by utilizing a magnetic charge distribution reconstruction algorithm to obtain the magnetic charge density of a non-defective region of the to-be-tested structure

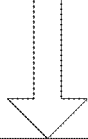

Utilize the magnetic charge density of the non-defective region of the to-be-tested structure as a constant, intercept MFLT signals of a defective region of the to-be-tested structure, and conduct inverse iteration to reconstruct defect depth of the defective region to obtain a 3D image of the defect existed in the to-be-tested structure

*Fig. 1*

3D DEFECT DETECTION METHOD WITH MAGNETIC FLUX LEAKAGE TESTING

CROSS REFERENCE TO RELATED APPLICATIONS

This application claims priority, and benefit under 35 U.S.C. § 119(e) of Chinese Patent Application No. 201910173344.5 filed 7 Mar. 2019. The disclosure of the prior application is hereby incorporated by reference as if fully set forth below.

TECHNICAL FIELD

The present invention belongs to the field of structural defect detecting technologies, and in particular relates to a 3D defect detection method with magnetic flux leakage testing (MFLT).

BACKGROUND

Magnetic flux leakage testing (MFLT) has the advantages of strong in-field defect identification capability, no strict cleanliness requirements on a to-be-tested surface, great penetration depth, simple device design, convenient operation, quick testing, and flexible capability working under complex environments, etc. The MFLT is a common method of the current nondestructive testing, which is widely applied to nondestructive defects testing in key components, such as oil-and-gas pipelines, oil storage tanks, railway tracks. MFLT is also an important technology in maintaining equipment integrity, eliminating accidents, reducing loss of life and properties, and protecting environments.

However, the existing MFLT technology is only suitable for locating the defects, poor in accuracy when assessing the dimensions of a defect, i.e., unable to determine their geometric shape and size simultaneously, especially for those defects with complex and irregular shapes. Therefore, its application is limited to roughly estimating the defect size.

SUMMARY

To improve the accuracy of the above MFLT technology in the prior art, the present invention provides a 3D defect detection method with MFLT, which includes the following steps:

S1: artificially magnetizing a to-be-tested structure, and acquiring its MFLT signals $\{B\}$;

S2: reconstructing magnetic charge distribution of the interior of the to-be-tested structure by using a magnetic charge distribution reconstruction algorithm to obtain the magnetic charge density of a non-defective region of the to-be-tested structure; and S3: assuming the magnetic charge density of the non-defective region of the to-be-tested structure as a constant, and intercepting MFLT signals over a defective region of the to-be-tested structure, and conducting inverse iteration to reconstruct defect depth point-by-point for the defective region, and finally for 3D reconstructed defect.

Step S3 specifically includes:

S31: according to a magnetic charge distribution theory, and on the premise of knowing the magnetic charge density of the non-defective region of the to-be-tested structure, the normal components of the MFLT signals at field point $r_j$ outside the plate, $\{B_z(r_j)\}$, can be expressed as $$B_z(r_j) = \frac{\mu_0 \rho v}{4\pi} \sum_{i=1}^{n} \frac{d_i + h}{\left(\sqrt{(x_i - x_j)^2 + (y_i - y_j)^2 + (d_i + h)^2}\right)^3} \quad (1)$$

where $\mu_0$ is the air permeability, $v$ is the finite element volume of a source point $r_i'$, $\rho$ is the magnetic charge density of the non-defective region of the to-be-tested structure, $h$ is the lift-off for the magnetic sensor, which is equal to the distance in the z-axis direction between the field point $r_j$ and the top surface of the plate, $x_j$, $x_i$, $y_j$, $y_i$ respectively are coordinates of the field point $r_j$ and the source point $r_i'$, and $d_i$ is the associated depth of a source point $r_i'$ on the defect surface, $i$ is the number of source point, $j$ is the number of field point, and $n$ is the total number of source point.

S32: all variables $d_i$ are collected as defect depth field $\{d_i\}$, and $h$ is used as an initial value of $\{d_i\}$, $$B_z(r_j) = \frac{\mu_0 \rho v}{4\pi} \Sigma_{i=1}^{n} \frac{d_i}{\left(\sqrt{(x_i - x_j)^2 + (y_i - y_j)^2 + d_i^2}\right)^3} \quad (2)$$

S33: according to step S32, an incidence relation of the MFLT signal $\{B_z(r_j)\}$ and the defect depth field $\{d_i\}$ and a coefficient matrix $k_d(i,j)$ are constructed, that is, $$\{B_z(j)\} = [k_d(i, j)]\{d_i\}, \quad (3)$$

and $$k_d(i, j) = \frac{\rho \mu_0 v}{4\pi} \left( \frac{1}{\left(\sqrt{(x_i - x_j)^2 + (y_i - y_j)^2 + d_i^2}\right)^3} - \frac{3d_i^2}{\left(\sqrt{(x_i - x_j)^2 + (y_i - y_j)^2 + d_i^2}\right)^5} \right); \quad (4)$$

S34: $B_z(r_j)\}$, $\{d_i\}$, and $[K_d(i,j)]$ are abbreviated as $\{B\}$, $\{d\}$ and $[K_d]$, respectively. According to the incidence relation of the MFLT signal $\{B\}$ and the defect depth field $\{d\}$ and the depth field coefficient matrix $[k_d]$, inverse iteration is conducted to obtain the defect depth $\{d\}$ of the defective region.

Preferably, the 3D defect detection method with MFLT is characterized in that, in step S34, an inverse iteration process of the defect depth field $\{d\}$ and the depth coefficient matrix $[k_d]$ is as follows:

St0: setting an initial value of $\{d\}$, iteration termination condition $\varepsilon_{end}$, and calculating $[k_d]$ with given initial $\{d\}$ according to Eq. (4);

St1: according to the formula $\{B\}=[K_d]\{d\}$, using the given $\{d\}$ and $[k_d]$ to calculate corresponding $\{B\}$, and obtaining a standard difference $\varepsilon$ between the calculated MFLT signal value $\{B\}$ and an intercepted MFLT signal value $\{B_{tar}\}$ over a defective area as shown in S3;

St2: comparing $\varepsilon$ with $\varepsilon_{end}$, if $\varepsilon$ is greater than up dating $\{d\}$ and $[K_d]$, repeating step St1 till $\varepsilon$ is less than $\varepsilon_{end}$, and iteration termination to obtain the defect depth field $\{d\}$.

Preferably, in step S1, the artificial magnetization strength is greater than the strength of a ground magnetic field.

The beneficial effects of the present invention include:

the present invention does not necessarily need the saturated magnetization, directly measures the MFLT signals of the defective structure, and conducts inverse iteration on the defect depth field according to the correlation equation between the MFLT signal and the defect depth field to finally obtain a 3D image of the defective region of the to-be-tested structure. Compared with the prior art, the present invention simplifies the MFLT devices and improves the imaging accuracy of the defects.

BRIEF DESCRIPTION OF THE DRAWINGS

The accompanying drawings are provided for further understanding of the present invention, constitute a part of the specification, are intended to explain the present invention with the embodiments of the present invention, but do not constitute limitations to the present invention. In the accompanying drawings:

FIG. 1 is a schematic diagram showing steps of the present invention.

DETAILED DESCRIPTION

Figure 4:
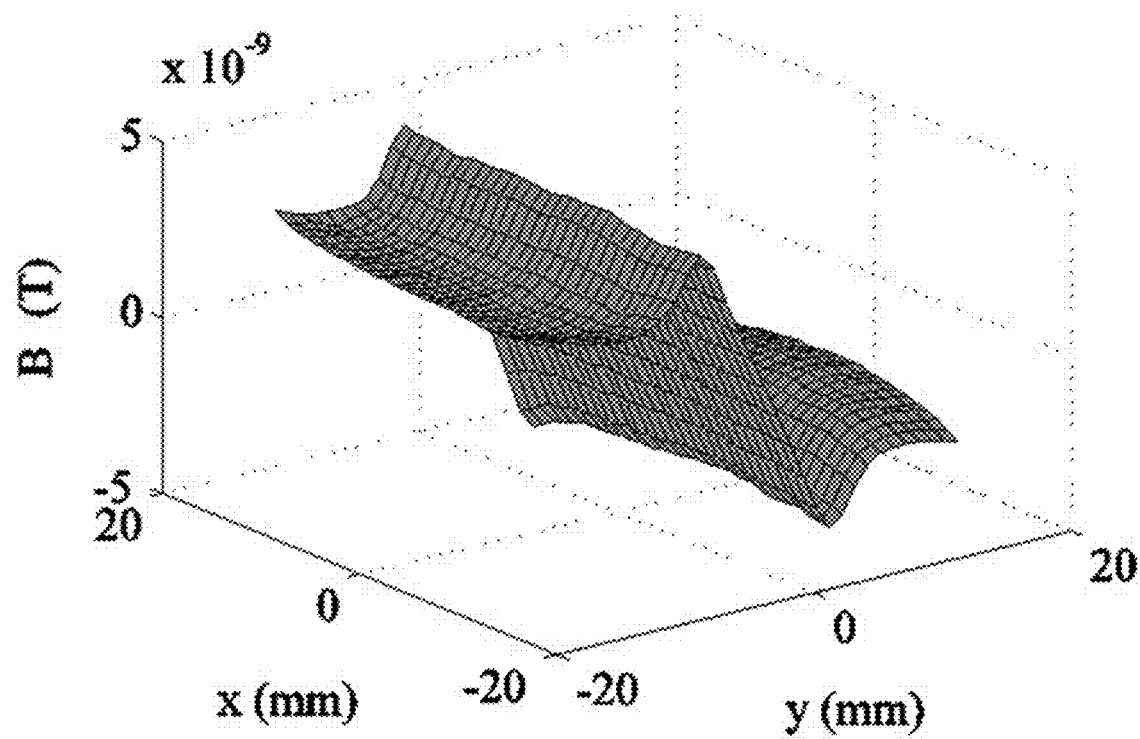
FIG. 4 shows MFLT signals of the to-be-tested structure shown in FIG. 3.
Figure 5:
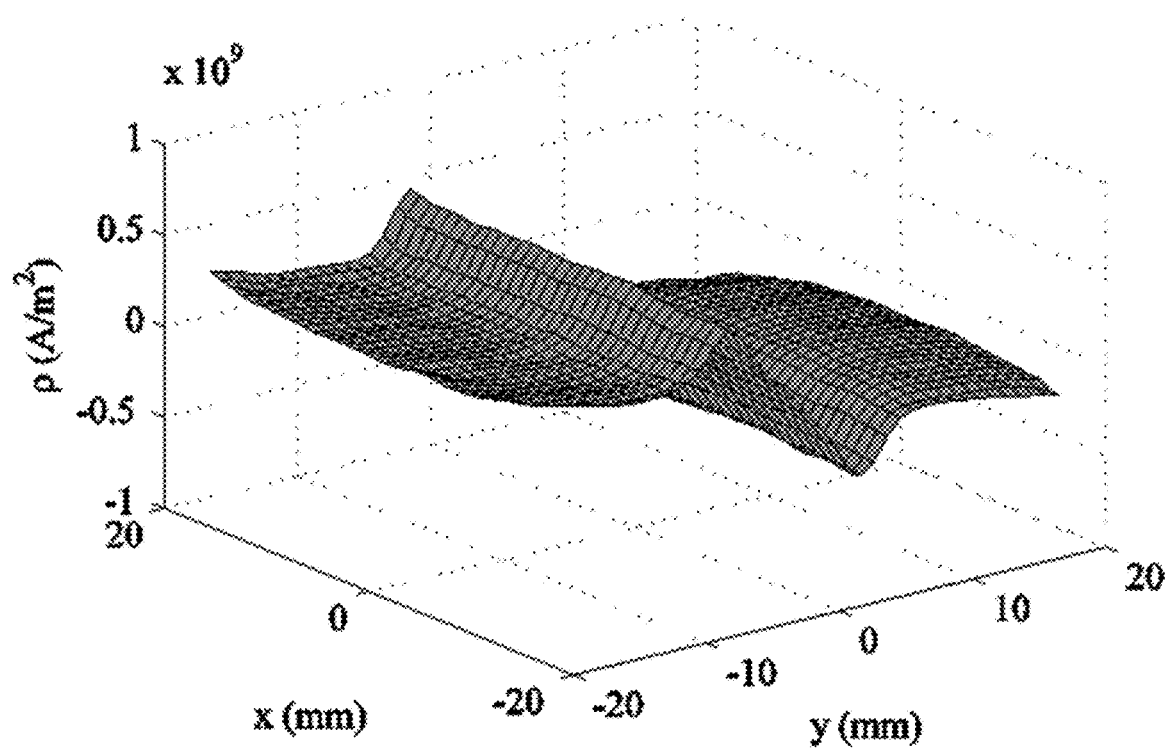
FIG. 5 is a reconstructed magnetic charge distribution diagram of the to-be-tested structure.

As shown in FIG. 1, embodiments of the present invention provide a 3D defect detection method with MFLT, which includes the following steps:

S1: conduct artificial magnetization on the to-be-tested structure, and measure its MFLT signals, as shown in FIG. 4;

S2: invert magnetic charge distribution of the interior of the to-be-tested structure by using a magnetic charge distribution reconstruction algorithm to obtain a reconstructed magnetic charge distribution of the to-be-tested structure, as shown in FIG. 5; and S3: utilize a maximum magnetic charge density $\rho$=5.6 E8 (namely a magnetic charge density of the non-defective region) of the structure connection portion in the reconstructed magnetic charge distribution as a constant and substitute it into Eq. (1-4), and conduct inverse iteration to reconstruct defect depth of the defective region to obtain a 3D image of the defective region of the to-be-tested structure.

Step S3 specifically includes:

S31: according to a magnetic charge distribution theory, and on the premise of knowing the magnetic charge density of the non-defective region of the to-be-tested structure, the normal components of the MFLT signals at field point $r_j$ outside the plate, $\{B_z(r_j)\}$ can be expressed as $$B_z(r_j) = \frac{\mu_0 \rho v}{4\pi} \sum_{i=1}^{n} \frac{d_i + h}{\left(\sqrt{(x_i - x_j)^2 + (y_i - y_j)^2 + (d_i + h)^2}\right)^3} \quad (1)$$

where $\mu_0$ is the air permeability, v is finite element volume of a source point, $\rho$ is the magnetic charge density of the non-defective region of the to-be-tested structure, h is the lift-off for the magnetic sensor, which is equal to the distance in the z-axis direction between the field point $r_j$ and the top surface of the plate, $x_j$, $x_i$, $y_j$, $y_i$ respectively are coordinates of the field point $r_j$ and the source point $r_i'$, and $d_i$ is the associated depth of a source point $r_i'$ on the defect surface, i is the number of source point, j is the number of field point, and n is the total number of source point;

S32: all variables $d_i$ are collected as defect depth field $\{d_i\}$, and h is used as an initial value of $\{d_i\}$, $$B_z(r_j) = \frac{\mu_0 \rho v}{4\pi} \sum_{i=1}^{n} \frac{d_i}{\left(\sqrt{(x_i - x_j)^2 + (y_i - y_j)^2 + d_i^2}\right)^3} \quad (2)$$

S33: according to step S32, an incidence relation of the MFLT signal $\{B_z(r_j)\}$ and the defect depth field and a coefficient matrix $k_d(i,j)$ are constructed, that is, $$\{B_z(j)\} = [k_d(i,j)]\{d_i\}, \quad (3)$$

and $$k_d(i,j) = \frac{\rho \mu_0 v}{4\pi} \left( \frac{1}{\left(\sqrt{(x_i - x_j)^2 + (y_i - y_j)^2 + d_i^2}\right)^3} - \frac{3 d_i^2}{\left(\sqrt{(x_i - x_j)^2 + (y_i - y_j)^2 + d_i^2}\right)^5} \right); \quad (4)$$

S34: $B_z(r_j)\}$, and $[K_d(i,j)]$ are abbreviated as $\{B\}$, $\{d\}$ and $[K_d]$, respectively. According to the incidence relation of the MFLT signal $\{B\}$ and the defect depth field $\{d\}$ and the depth field coefficient matrix $[k_d]$, inverse iteration is conducted to obtain the defect depth $\{d\}$ of the defective region, namely a 3D image of the defective region, as shown in FIG. 5.

Figure 2:
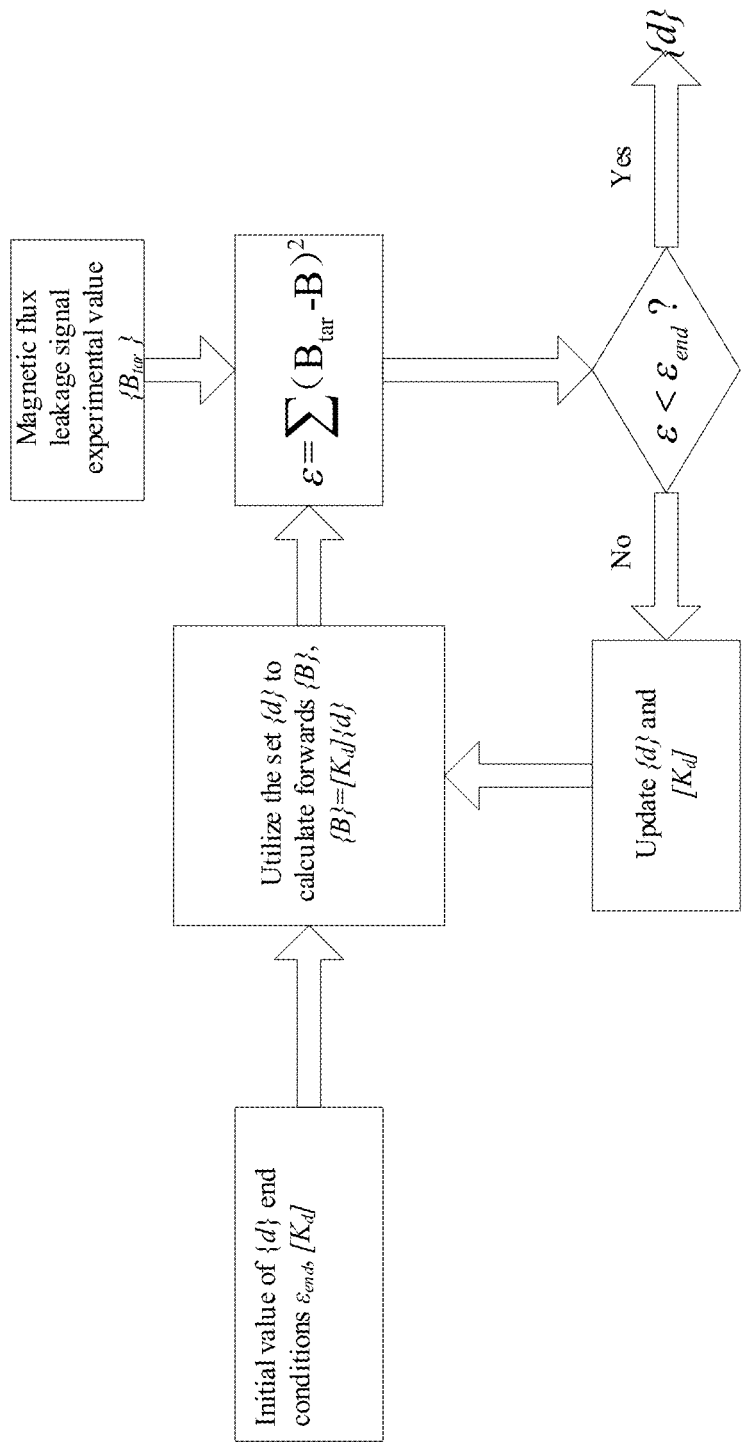
FIG. 2 is an inverse iteration process of a defect depth field and a depth coefficient matrix in the present invention.

Preferably, as shown in FIG. 2, in step S34, an inverse iteration process of the defect depth field and the depth coefficient matrix is as follows:

St0: set an initial value of $\{d\}$, end an iteration condition $\varepsilon_{end}$, and calculate $[k_d]$ with given initial $\{d\}$ according to Eq. (4);

St1: according to the formula $\{B\}=[K_d]\{d\}$, utilize the given $\{d\}$ and $[k_d]$ to calculate corresponding $\{B\}$, and obtain a standard difference $\varepsilon$ between the calculated MFLT signal value $\{B\}$ and an intercepted MFLT signal value $\{B_{tar}\}$ over a defective area as shown in S3;

St2: compare $\varepsilon$ with $\varepsilon_{end}$, if $\varepsilon$ is greater than $\varepsilon_{end}$, update $\{d\}$ and $[K_d]$, repeat step St1 till $\varepsilon$ is less than $\varepsilon_{end}$, and end iteration to obtain the defect depth field $\{d\}$.

Figure 3:
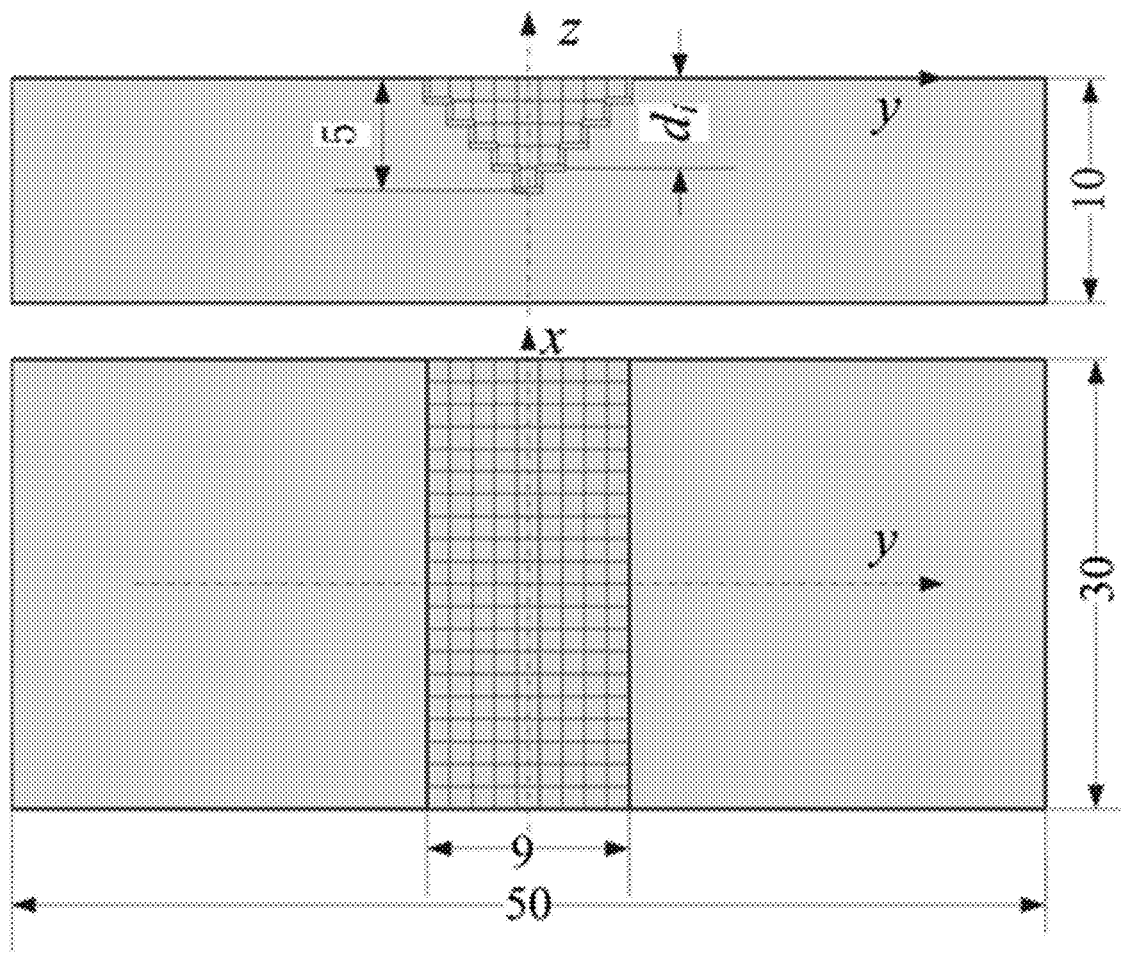
FIG. 3 is a schematic structural diagram of a V-shaped defect of a to-be-tested structure.
Figure 6:
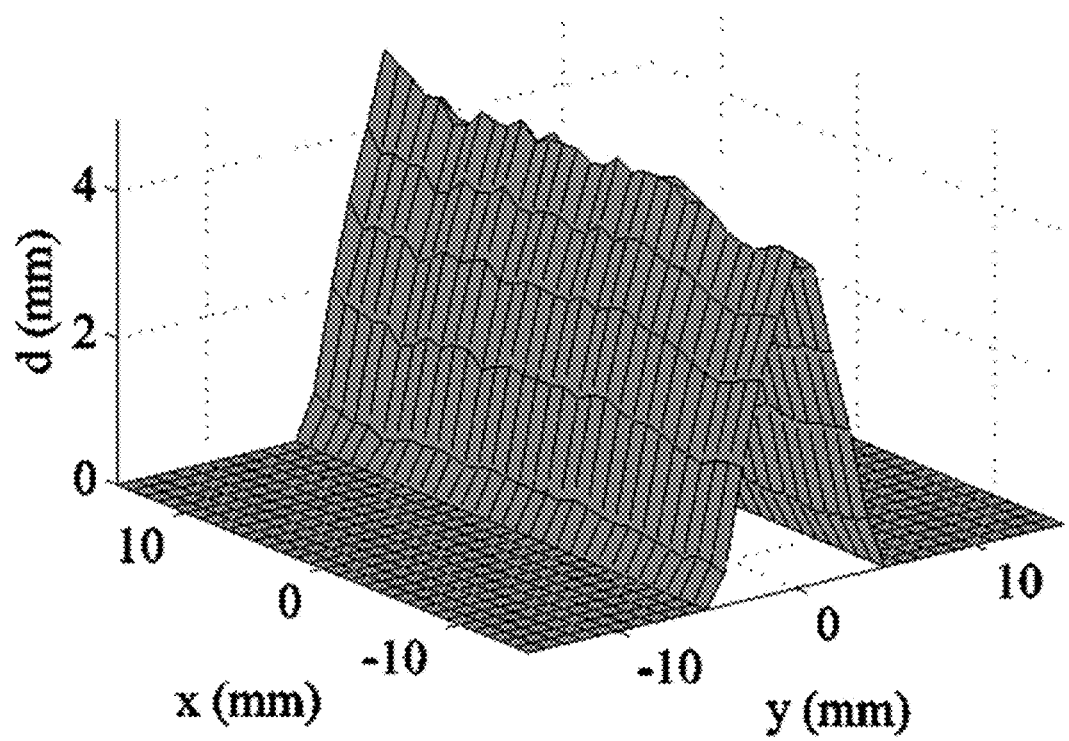
FIG. 6 is a reconstructed depth field distribution diagram of a defective region of the to-be-tested structure.

It can be known by comparing FIG. 3 with FIG. 6, the defect depth field of the to-be-tested structure obtained by using the method of the embodiment of the present invention is consistent with the defect sizes of the to-be-tested structure, so the present invention improves the detection accuracy in comparison with the prior art.

In conclusion, the method provided by the present invention does not necessarily need the saturated magnetization, directly measures the MFLT signals of the defective specimen, and conducts inverse iteration on the defect depth field according to the incidence relation of the MFLT signal and the defect depth field to finally obtain a 3D image of the defective region of the to-be-tested structure. Compared with the prior art, the present invention simplifies the MFLT devices and improves the imaging accuracy of the defects.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A 3D imaging method for defect using a reconstruction algorithm with the signals detected by a magnetic flux leakage testing (MFLT) device, wherein the method comprises the following steps:
   S1: applying magnetic field to a to-be-tested structure and acquiring associated MFLT signals {B} via the MFLT device;
   S2: reconstructing its distribution of magnetic charge density inside the to-be-tested structure by using an algorithm, and extracting the magnetic charge density of a non-defective region near the boundary of the defective region;
   S3: intercepting the MFLT signals over a defective region, and reconstructing a depth field of the defect by applying an iteration algorithm by assuming the magnetic charge density over the entire structure to be a constant value, which is obtained from S2 above, the depth field forming a 3D image of the defect,
   where S3 includes:
   S31: according to a magnetic charge distribution theory, and on the premise of knowing the magnetic charge density of the to-be-tested structure, the normal components of the MFLT signals at field point $r_j$ outside a plate, $\{B_z(r_j)\}$, can be expressed as $$B_z(r_j) = \frac{\mu_0 \rho v}{4\pi} \sum_{i=1}^{n} \frac{d_i + h}{\left(\sqrt{(x_i - x_j)^2 + (y_i - y_j)^2 + (d_i + h)^2}\right)^3} \quad (1)$$

where $\mu_0$ is the air permeability, v is the finite element volume of a source point $r'_i$, $\rho$ is the magnetic charge density of the to-be-tested structure, h is the lift-off for the magnetic sensor, which is equal to the distance in the z-axis direction between the field point $r_j$ and the top surface of the plate, $x_j$, $x_i$, $y_j$, $y_i$ respectively are coordinates of the field point $r_j$ and the source point $r'_i$, and $d_i$ is the associated depth of a source point $r_i'$ on the defect surface, i is the number of source point, j is the number of field point, and n is the total number of source point, S32: all variables $d_i$ are collected as the defect depth field $\{d_i\}$, and h is used as an initial value of $\{d_i\}$, $$B_z(r_j) = \frac{\mu_0 \rho v}{4\pi} \sum_{i=1}^{n} \frac{d_i}{\left(\sqrt{(x_i - x_j)^2 + (y_i - y_j)^2 + d_i^2}\right)^3} \quad (2)$$

S33: according to step S32, a correlation equation of the MFLT signal $\{B_z(r_j)\}$ and the defect depth field $\{d_i\}$ and a coefficient matrix $k_d(i,j)$ is constructed, that is, $$\{B_z(r_j)\} = [k_d(i, j)]\{d_j\}\{B_z(j)\} = [k_d(i, j)]\{d_i\}, \quad (3)$$

and $$k_d(i, j) = \frac{\rho \mu_0 v}{4\pi}\left(\frac{1}{\left(\sqrt{(x_i - x_j)^2 + (y_i - y_j)^2 + d_i^2}\right)^3} - \frac{3d_i^2}{\left(\sqrt{(x_i - x_j)^2 + (y_i - y_j)^2 + d_i^2}\right)^5}\right); \quad (4)$$

S34: $\{B_z(r_j)\}$, $\{d_i\}$, and $[k_d(i,j)]$ are abbreviated as $\{B\}$, $\{d\}$ and $[k_d]$, respectively; and according to the correlation equation of the MFLT signal $\{B\}$, the defect depth field $\{d\}$ and the coefficient matrix $[k_d]$, inverse iteration is conducted to obtain the defect depth field $\{d\}$ of the defective region.

2. The 3D defect reconstruction method with MFLT signals according to claim 1, wherein in step S34, an inverse iteration process of the defect depth field $\{d\}$ and the depth coefficient matrix $[k_d]$ is as follows:
   St0: setting an initial value of $\{d\}$, iteration terminating condition $\varepsilon_{end}$, calculating $[k_d]$ with given initial $\{d\}$ according to Eq. (4)
   St1: according to the formula $\{B\}=[k_d]\{d\}$, using the given $\{d\}$ and $[k_d]$ to calculate corresponding $\{B\}$, and obtaining a standard difference $\varepsilon$ between the calculated MFLT signal value $\{B\}$ and an intercepted MFLT signal value $\{B_{tar}\}$ over a to-be-tested defective area as shown in S3;
   St2: comparing $\varepsilon$ with $\varepsilon_{end}$, if $\varepsilon$ is greater than $\varepsilon_{end}$, updating $\{d\}$ and $[k_d]$, repeating step St1 till $\varepsilon$ is less than $\varepsilon_{end}$, and iteration termination to obtain the defect depth field $\{d\}$.

* * * * *